United States Patent

Ziemek

[11] Patent Number: 5,924,194
[45] Date of Patent: Jul. 20, 1999

[54] METHOD OF PRODUCING AN OVERHEAD CONTACT WIRE FOR SUPPLYING POWER TO ELECTRICALLY DRIVEN VEHICLES

[75] Inventor: Gerhard Ziemek, Langenhagen, Germany

[73] Assignee: Alcatel, France

[21] Appl. No.: 08/856,667

[22] Filed: May 15, 1997

[30] Foreign Application Priority Data

Jul. 9, 1996 [DE] Germany ............................ 196 27 162

[51] Int. Cl.$^6$ ............................ H01R 43/02; H01R 43/04
[52] U.S. Cl. ............................ 29/868; 29/527.7; 228/130; 228/148
[58] Field of Search ................................ 29/33 F, 34 D, 29/828, 868, 871, 81.04, 527.7, 81.11, 472.3; 219/602, 605, 645; 228/148, 130, 129, 158, 126

[56] References Cited

U.S. PATENT DOCUMENTS

| | | | |
|---|---|---|---|
| 1,011,744 | 12/1911 | Baptiste | 228/158 |
| 2,913,354 | 11/1959 | Bell | 29/81.04 |
| 3,154,442 | 10/1964 | Nye | 29/81.04 |
| 3,408,727 | 11/1968 | Dion | 228/130 |
| 3,444,610 | 5/1969 | Thomson | 228/130 |
| 3,455,016 | 7/1969 | Dion | 228/130 |
| 3,894,675 | 7/1975 | Klebl | 228/130 |
| 4,227,061 | 10/1980 | Westfall | 228/148 |
| 4,260,095 | 4/1981 | Smith | 228/129 |
| 4,759,486 | 7/1988 | Malone | 228/148 |

FOREIGN PATENT DOCUMENTS

| | | | |
|---|---|---|---|
| 0 298 518 | 1/1989 | European Pat. Off. . | |
| 14795 | 2/1892 | France | 29/527.7 |
| 341887 | 1/1928 | Germany | 228/148 |
| 735 168 | 5/1943 | Germany . | |
| 34 03 872 A1 | 1/1984 | Germany . | |
| 36 25 755 C2 | 8/1989 | Germany . | |
| 181349 | 8/1923 | United Kingdom | 29/81.11 |

OTHER PUBLICATIONS

Journal: "Draht" 41 (1990) pp. 92–96.

*Primary Examiner*—Peter Vo
*Assistant Examiner*—Minh Trinh
*Attorney, Agent, or Firm*—Ware, Fressola et al.

[57] ABSTRACT

A method of producing an overhead contact wire for supplying power to electrically driven vehicles is proposed which comprises a copper-clad steel wire and a copper wire that is metallically joined to the copper-clad steel wire. The method includes the following steps: a) heating a steel wire to a temperature about 950° C.; b) joining first and second metal band sections to a surface of the steel wire by means of rolling at a temperature of about 950° C. under protective gas atmosphere to produce a combined element; c) reducing the cross-section of the combined element by at least 20%; d) heating a copper wire to a temperature about 950° C.; e) joining the heated copper wire to the reduced diameter combined element in the area covered by the first band section by rolling at about 950° C. under protective gas to produce a prepared wire; and f) reducing the cross-section of the prepared wire to produce an overhead contact wire.

14 Claims, 1 Drawing Sheet

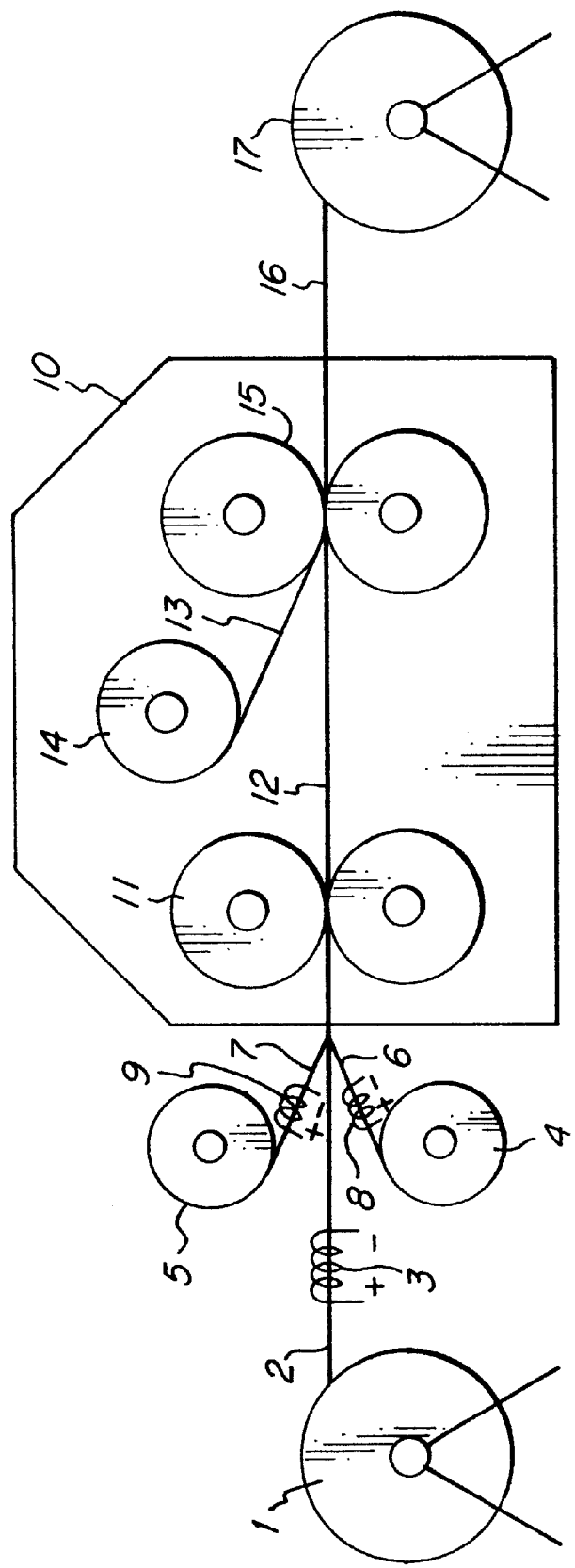

METHOD OF PRODUCING AN OVERHEAD CONTACT WIRE FOR SUPPLYING POWER TO ELECTRICALLY DRIVEN VEHICLES

BACKGROUND OF THE INVENTION

1. Technical Field

The invention concerns a method of producing an overhead contact wire for supplying power to electrically driven vehicles and which comprises a copper-clad steel wire and a copper wire that is metallically joined to the copper-clad steel wire.

2. Description of the Prior Art

An overhead contact wire comprising a copper-clad steel wire is known from EP-A-0298518. The cladding of this overhead contact wire makes up between 45 and 75% of the overhead contact wire's cross-section and is metallically joined to the steel wire.

To produce such an overhead contact wire a cold soft steel wire is peeled and dipped into a molten copper bath so that a copper coating congeals on the surface of the steel wire. The thus obtained wire is then rolled at a temperature between 750 and 850° C. and the cross-section is reduced by 10 to 40%. These processes are repeated until the desired thickness of the copper cladding is attained.

This method is known under the name of "dip-forming" and is very time consuming and expensive. This overhead contact wire takes into account that over time the copper cladding will be abraded by the current collector, and that the current collector will then directly contact the steel wire.

A method of producing an overhead contact wire is known from DE-A-3403872, wherein a steel wire is clad with a copper ribbon in a continuous operation and is formed into a copper-clad steel wire by means of a rolling device. A wire made of a wear-resistant copper alloy is attached to the copper ribbon during the same rolling process. In subsequent operations, the combined element is formed into the desired cross-sectional profile by means of rolling or drawing at room temperature. In the operating mode, the wear-resistant copper alloy wire makes contact with the current collector. Both the copper-clad steel wire and the wear-resistant copper alloy wire take over the tension force, while the copper cladding and the wear-resistant copper alloy wire are used for the current conduction. Wear caused by the current collector must be anticipated in spite of the fact that a wear-resistant copper alloy is being used, so that in time the overhead contact wire loses both the cross-section that carries the current as well as the cross-section that takes over the tension force.

Beyond that the simultaneous combination of a steel wire, a copper ribbon and a copper alloy wire produces many problems. Measures to improve the quality must additionally be taken with the copper alloy wire in order to achieve the high wear resistance.

It is an object of the present invention to present a method for producing an overhead contact wire in which the area that contacts the current collector has a high-tensile core made of a high-tensile steel wire and the current is conducted by a copper wire.

The method for producing an overhead contact wire for supplying electrically driven vehicles, comprises the steps of:

a) heating a steel wire to a temperature about 950° C.;
b) joining first and second metal band sections to a surface of the steel wire by means of rolling at a temperature of about 950° C. under protective gas atmosphere to produce a combined element;
c) reducing the cross-section of the combined element by at least 20%;
d) heating a copper wire to a temperature about 950° C.;
e) joining the heated copper wire to the reduced diameter combined element in the area covered by the first band section by rolling at about 950° C. under protective gas to produce a prepared wire; and
f) reducing the cross-section of the prepared wire to produce an overhead contact wire.

The wear caused by the current collector is significantly reduced due to the fact that the second metal band section for encasing the steel wire is made of a high-tensile copper alloy. The cross-section of the steel wire and its alloy are designed so that the higher tensile strength of the overhead contact wire required for higher traveling speeds is taken over by the steel wire. The copper wire is essentially used to conduct current and its cross-section must be selected accordingly.

The invention will be fully understood when reference is made to the following detailed description taken in conjunction with the accompanying drawing.

BRIEF DESCRIPTION OF THE DRAWING

FIG. 1 is a schematic illustration of an apparatus used to perform the novel method of the present invention.

FIG. 2 is a cross-sectional view of the combined wire formed during performance of the method of the present invention.

FIG. 3 is a cross-sectional view of the prepared wire formed during the performance of the method of the present invention.

DETAILED DESCRIPTION OF THE INVENTION

A high-tensile steel wire 2 is continuously drawn from a storage spool 1, it is cleaned in a not illustrated manner, e.g. by chemically cleaning or brushing, and heated in a heating device 3 to a temperature of about 950° C. Simultaneously, two metal band sections 6 and 7 are unwound from storage spools 4 and 5 and are formed into a self-closing sheath around the steel wire 2. The surfaces of the band sections 6 and 7 that face the steel wire surface are also cleaned, e.g. by brushing. Before they are applied to the steel wire 2, the band sections 6 and 7 are heated to a temperature of about 950° C. by heating devices 8 and 9. The band sections 6 and 7 are made of copper. However, the band section 6 can be made of a wear-resistant copper alloy such as tin-bronze.

The steel wire 2 and the band sections 6 and 7 which are applied to its bare surface are forwarded to a housing 10 that contains a protective gas atmosphere, preferably a reducing gas atmosphere, and a temperature of about 950° C. A first pair of rollers 11 rolls the band sections 6 and 7 onto the surface of the steel wire 2 and simultaneously reduces the cross-section of the combined wire 12 comprising the steel wire 2 and the band sections 6 and 7 by about 20%. At the same time, the lengthwise seams between the band sections 6 and 7 are closed.

It is advantageous if the brushing of the steel wire 2 and the band sections 6 and 7 takes place inside the housing 10.

A bare oxide-free copper wire 13 is drawn from a storage spool 14 and continuously supplied to the combined wire 12 with the reduced cross-section. A second pair of rollers 15 metallurgically joins the combined wire 12 and the copper wire 13. This is preferably done by rolling the copper wire 13 into the area covered by the band section 7. The rolling process produces a cross-sectional reduction of about 20%.

The prepared wire 16 comprising the combined wire 12 and the rolled copper wire 13 is subsequently wound on a storage spool 17. The prepared wire 16 is then formed at room temperature into the desired reduced cross-section to form an overhead contact wire by means of one or several rolling or drawing procedures.

As the overhead contact wire, the copper wire 13 takes over the largest portion of the current conduction while the copper-clad steel wire absorbs the tension force as well as the wear abrasion produced by the current collector.

The preferred embodiment described above admirably achieves the objects of the invention. However, it will be appreciated that departures can be made by those skilled in the art without departing from the spirit and scope of the invention which is limited only by the following claims.

What is claimed is:

1. A method of producing an overhead contact wire for supplying power to electrically driven vehicles, comprising the steps of:
   a) heating a steel wire to a temperature about 950° C.;
   b) joining first and second metal band sections to a surface of the steel wire by means of rolling at a temperature of about 950° C. under protective gas atmosphere to produce a combined element;
   c) reducing the cross-section of the combined element by at least 20%;
   d) heating a copper wire to a temperature about 950° C.;
   e) joining the heated copper wire to the reduced cross-section combined element in the area covered by the first band section by rolling at about 950° C. under protective gas atmosphere to produce a prepared wire; and
   f) reducing the cross-section of the prepared wire to produce an overhead contact wire.

2. The method as claimed in claim 1, wherein the first metal band section is made of copper.

3. The method as claimed in claim 2, wherein the second metal band section is made of copper.

4. The method as claimed in claim 2, wherein the second metal band section is made of a high-tensile copper alloy.

5. The method as claimed in claim 4, wherein the high-tensile copper alloy is tin-bronze.

6. The method as claimed in claim 1, wherein the second metal band section is made of copper.

7. The method as claimed in claim 1, wherein the second metal band section is made of a high-tensile copper alloy.

8. The method as claimed in claim 7, wherein the high-tensile copper alloy is tin-bronze.

9. The method as claimed in claim 1, wherein the protective gas atmosphere in step b is a reducing gas atmosphere.

10. The method as claimed in claim 9, wherein the protective gas atmosphere in step e is a reducing gas atmosphere.

11. The method as claimed in claim 1, wherein the protective gas atmosphere in step e is a reducing gas atmosphere.

12. The method as claimed in claim 1, wherein the first and second metal band sections are metallurgically joined to the steel wire during step b.

13. The method as claimed in claim 1, wherein the heated copper wire and the reduced diameter combined element are metallurgically joined during step e.

14. The method as claimed in claim 1, wherein the first and second metal band sections form closed lengthwise seams.

* * * * *

UNITED STATES PATENT AND TRADEMARK OFFICE
CERTIFICATE OF CORRECTION

PATENT NO.   : 5,924,194
DATED        : July 20, 1999
INVENTOR(S)  : Gerhard Ziemek It is certified that error appears in the above-identified patent and that said Letters Patent is hereby corrected as shown below:

On the cover page of the patent under Foreign Application Priority Data, "196 27 162" should be --196 27 612--.

Signed and Sealed this

Seventh Day of December, 1999

Attest:

Q. TODD DICKINSON

*Attesting Officer*    Acting Commissioner of Patents and Trademarks